United States Patent [19]

Meyer et al.

[11] Patent Number: 5,066,854

[45] Date of Patent: Nov. 19, 1991

[54] METHOD OF AND APPARATUS FOR GUIDING A SELF-STEERING VEHICLE ALONG AN OPTICAL GUIDEWAY

[75] Inventors: Urs Meyer, Niederglatt; Rene F. Oberhansli, Wiesendangen; Dominik Häusler, Unterageri, all of Switzerland

[73] Assignee: Rieter Machine Works Ltd., Winterthur, Switzerland

[21] Appl. No.: 480,205

[22] Filed: Feb. 14, 1990

[30] Foreign Application Priority Data

Feb. 16, 1989 [CH] Switzerland ............... 00538/89

[51] Int. Cl.[5] .................................................. G05B 1/00
[52] U.S. Cl. ....................................... 250/202; 180/169
[58] Field of Search ............ 250/202, 214 R, 214 AG, 250/208.3; 180/167, 168, 169

[56] References Cited

U.S. PATENT DOCUMENTS

| 3,881,568 | 5/1975 | Ando et al. ........................ 250/202 |
| 4,003,445 | 1/1977 | Bruine .................................. 250/202 |
| 4,703,240 | 10/1987 | Yoshimoto ......................... 250/202 |
| 4,703,820 | 11/1987 | Reinaud .............................. 180/169 |
| 4,775,023 | 10/1988 | Shimada et al. ................... 180/168 |

FOREIGN PATENT DOCUMENTS

0195191 9/1986 European Pat. Off. .
3715025 11/1987 Fed. Rep. of Germany .

OTHER PUBLICATIONS

"Self-Adjusting Analog Toner Patch Sensor IBM Technical Disclosure Bulletin", vol. 29; No. 9, p. 4189; Feb. 1987 Armonk, New Work U.S.A.
Fahrerlose Flurforderzeuge—Hilfen auf dem Wege zur Automatisierung, P. Gunsser; in Textil Praxis International 1984; vol. 7, pp. 661-664.
Neue Systeme zur Steuerung von Flurforderzeugen, Hartmut Jorich; in Technisch Rundschau, vol. 1/89; pp. 34 through 39, 1989.

*Primary Examiner*—David C. Nelms
*Attorney, Agent, or Firm*—Sandler, Greenblum & Bernstein

[57] ABSTRACT

There are provided a method of and an apparatus for guiding a self-steering or driverless vehicle along an optical guideway. The hitherto known systems, which relate to optical scanning of an optical guideway by means of a light beam and which only transmit the signals "light" and "dark" with respect to detection of the optical guideway, are liable to disturbances and result in a too coarse or non-sensitive control. Therefore, it is suggested to scan the optical guideway by means of light pulses emitted in a predetermined frequency by sensors, whereby the intensity of the reflected light generates by means of an electronic evaluation unit a signal for controlling a steering or guiding mechanism. It is suggested to scan the optical guideway as an analog value by means of individual sensors arranged in a row and further process the determined values as digital values.

24 Claims, 2 Drawing Sheets

METHOD OF AND APPARATUS FOR GUIDING A SELF-STEERING VEHICLE ALONG AN OPTICAL GUIDEWAY

BACKGROUND OF THE INVENTION

The present invention broadly relates to self-propelled or self-steering or driverless floor vehicles and pertains, more specifically to a new and improved method of guiding a self-steering vehicle along an optical guideway. The present invention also relates to a new and improved apparatus for guiding a self-steering vehicle according to the inventive method.

Driverless floor transport vehicles are known, for example, from a reprint of a paper entitled "Fahrerlose Flurförderzeuge—Hilfen auf dem Wege zur Automatisierung" (translated as "Driverless floor transport vehicles—resources on the way to automation") by P. Gunsser in TEXTIL PRAXIS INTERNATIONAL 1984, volume 7, pages 661 through 664, such vehicles being electromagnetically guided or steered along a guide cable or wire by means of sensors mounted at the vehicle, such guide cable or wire being laid in the floor. This implies that a groove for laying the guide cable or wire has to be cut or milled into the floor, particularly in the case of subsequent installation of such a vehicle guide system. This is relatively costly and, with certain floor materials, would require an extensive preparatory operation not readily carried out.

Furthermore, systems are known in which, instead of a guide cable or wire, there is provided on the floor an optical strip which is scanned by means of sensors, such sensors emitting or radiating a pulsed light beam.

In such systems there are generally used two sensors which are mounted at the vehicle in such a manner that the spacing or distance between the two sensors, as viewed transversely relative to the direction of travel, is slightly larger than the width of the optical strip. In other words, the sensors signal whether the light beam is reflected from the guide strip or from the floor close to the guide strip and, in the event of a corresponding deviation, trigger a control signal for a steering or guiding mechanism. Since this prior art system is only constructed for two conditions, namely "light" and "dark", the system operates in a too coarse and too inaccurate manner, particularly since damage to the guide strip and dirt on the floor are detected by the two sensors as an incorrect or erroneous signal and result in a faulty guide or steering signal.

Control systems are also known, for example, from a paper entitled "Neue Systeme zur Steuerung von Flurförderzeugen" (translated as "New systems for controlling floor transport vehicles") by Hartmut Jorichs in TECHNISCHE RUNDSCHAU, volume 1/89, pages 34 through 39, in which the guidance of a vehicle is effected by means of lasers or by scanning the walls by means of ultrasonic waves. In such control systems, the path or guideway for the vehicle cannot be appraised by the human eye. Accordingly, these systems are only suitable for areas without any operating personnel.

The guidance by means of pattern recognition or identification and picture analysis or interpretation by a camera would require a corresponding constructional expenditure and, therefore, represents a costly system which would be susceptible to disturbances.

SUMMARY OF THE INVENTION

Therefore, with the foregoing in mind, it is a primary object of the present invention to provide a new and improved method of, and apparatus for, guiding a self-steering or driverless vehicle along an optical guideway, which method and apparatus do not suffer from the aforementioned drawbacks and shortcomings of the prior art.

Another and more specific object of the present invention aims at providing a new and improved method of, and apparatus for, guiding a self-steering vehicle along an optical guideway or guide line, which method and apparatus render possible optimum guidance along a guideway, whereby short-term irregularities occurring in the region or area of the guideway are detected and compensated.

Now in order to implement these and still further objects of the present invention which will become more readily apparent as the description proceeds, the method of guiding a self-steering vehicle along an optical guideway or the like is manifested, among other things, by the steps of scanning the optical guideway by means of light pulses emitted in a predetermined frequency by sensors, generating a signal from the intensity of the reflected light by means of an electronic evaluation unit, and using such signal to control a steering or guiding mechanism.

The scanning as an analog value is advantageously effected by means of a row of individual sensors. The digital further processing of such analog value renders possible accurate determination of position or localization of the path of travel by means of the electronic evaluation unit.

It has proven advantageous, particularly with respect to the construction of the electronic evaluation unit, when the guideway or reference path or the like is scanned by means of sensors which are substantially transversely arranged relative to the direction of travel of the vehicle, such sensors emitting and receiving light pulses. The scanning is thereby successively effected in chronological sequence relative to the number of sensors, the measurement signals evaluated by means of a computer advantageously serving to control the steering or guiding mechanism.

For eliminating component tolerances within the entire measuring and control system, it is further suggested that the sensors and the electronic evaluation unit are adjusted or compensated (balanced or tuned) to a predetermined or given measurement value. In such adjustment or compensation process or operation, a test or adjustment surface is impinged or acted on by the sensors, which sensors also receive the light intensity reflected at the test or adjustment surface. The state or condition and the color of the test or adjustment surface must be the same for each and every sensor.

The adjustment or compensation values automatically determined to the aforesaid predetermined or given measurement value in the course of the equalizing or adjustment process are entered or stored in an adjustment-value table for each individual sensor, such adjustment values being referred to or called upon during operation as a measure for the evaluation or control of the sensors.

It is advantageous to automatically carry out the sensor adjustment or compensation process, whereby respective current drivers or driver stages of the individual sensors, such current drivers or driver stages producing or generating the light pulses, are adjusted or tuned to a predetermined or given measurement value by means of an adjustment device. During the adjustment or compensation process of the transmitter parts and the receiver parts of the sensors, it is advantageous to include the amplifier stages arranged downstream of the receiver parts of the sensors as well as the electronic evaluation unit following the amplifier stages.

For controlling the guide sensors there are suggested various possibilities which serve to include the determined adjustment values of the adjustment-value table for the control of the guide sensors.

In this manner, it is possible that, on the one hand, the transmitter parts of the sensors can be influenced by the values allocated to the individual sensors of the adjustment-value table and that, on the other hand, the receiver parts of the sensors can also be influenced by the values allocated to the individual sensors of the adjustment-value table.

A further proposal relates to the arithmetical consideration of the adjustment values during the evaluation process of the transmitted measurement values.

As alluded to above, the invention is not only concerned with the aforementioned method aspects, but also relates to a new and improved apparatus for performing and carrying out the inventive method of guiding a self-steering or driverless vehicle along an optical guideway.

The inventive apparatus for guiding a self-steering vehicle along an optical guideway is manifested, among other things, by the features that at least two sensors are provided at the vehicle for emitting light pulses to scan the optical guideway, whereby each one of the at least two sensors comprises a transmitter and a receiver. The individual transmitters of the at least two sensors are provided with respective current driver stages which are acted on by a voltage supplied by voltage converter means or a digital-to-analog converter, such voltage corresponding with a predetermined adjustment value. The receivers of the at least two sensors are provided with respective amplifier parts or stages and with a pulse-width measuring device, the light signals received by the receivers of the sensors being guided via the individual amplifier parts or stages to the pulse-width measuring device, which feeds the thereat determined values to an evaluation stage of a computer. A control unit is provided for controlling a steering or guiding mechanism in accordance with a control signal corresponding with the evaluation and arriving from the evaluation stage of the computer.

In order to simplify the electronic circuit, it is suggested that the at least two sensors are substantially transversely mounted relative to the direction of travel of the vehicle and that a transmit-multiplexer is provided in order that the current driver stages of the respective transmitters of the at least two sensors are successively energized with a voltage corresponding with the respective controlled transmitter.

It is also suggested that a receive-multiplexer is provided for successively transmitting the signals successively supplied by the receivers via respective amplifiers to the following pulse-width measuring device via an output bus or line, which pulse-width measuring device passes on the thereby determined values to the evaluation stage of the following computer.

By providing a transmit-multiplexer and a receive-multiplexer which permit transmission of the signals of the individual sensors in succession, it is possible to control all sensors by means of only one converter, or digital-to-analog converter, controlled in accordance with the adjustment values. Likewise, only one pulse-width measuring device is required for all sensors.

The use of infrared light pulses has been found to be particularly advantageous, whereby the influence of disturbing or interfering light is entirely precluded.

A further suggestion is related to the emission of ultraviolet light pulses, whereby the guideway consists of a fluorescent guide strip and the ultraviolet light pulses converted into visible light are registered and detected by the respective receivers of the at least two sensors.

In order to arrive at a compact and simple construction, it is advantageous that the transmitters together with the current driver stages and the receivers together with the amplifiers are respectively mounted side-by-side in series at a plate, the amplifiers being provided with a screen or shielding with respect to the transmitters, whereby the printed wire or circuit board of the electronic evaluation unit and the printed wire or circuit board of the computer unit can be connected by means of plug connections with the sensor arrangement.

The connection of the computer unit with a primary or controlling host computer renders possible the exact control of the vehicle, also in the area of deviations or turns and intersections.

The computer unit thereby receives from the host computer a predetermined driving task or drive mission relative to the path guidance or guideway and can thereby transmit, particularly in the case of deviations or turns and intersections, a command to the electronic evaluation unit for the use of another calculation or computational rule for evaluation of the determined measurement values.

If, for example, in the case of normal guidance at the guideway, viewed transversely to the direction of travel, the measurement values determined for the two halves of the row of sensors are compared with one another, then it is readily conceivable, in the area of a deviation or turn, to adjust the scanning to the left-hand edge or to the right-hand edge of the optical guideway.

In other words, when the vehicle turns to the right at a turnout, only the measured values of the right-hand half of the row of sensors, which right-hand half sweeps over the right-hand edge of the optical guideway, are considered for evaluating the determination of vehicle position.

However, it is also possible to include all measured values in the evaluation and to thereby detect only the contrast increase at the respective edge of the guideway.

By virtue of the connection to the host computer, the computer unit is in a position to transmit certain signals to the host computer such as, for example, "guideway beyond a tolerance range" or "entering turnout" or "curved path of travel". In this manner, the host computer, which among other things controls the motor of the vehicle drive, reduces the travelling speed or, in case of emergency, can totally brake the vehicle.

In certain cases it can be advantageous when the control of the vehicle is directly effected by means of the host computer and the sensor control is placed out of action by means of the connection to the computer unit.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the exemplary embodiment of apparatus for guiding a self-steering or driverless vehicle along an optical guideway has been illustrated therein as is needed to enable one skilled in the art to readily understand the underlying principles and concepts of this invention.

Figure 1:
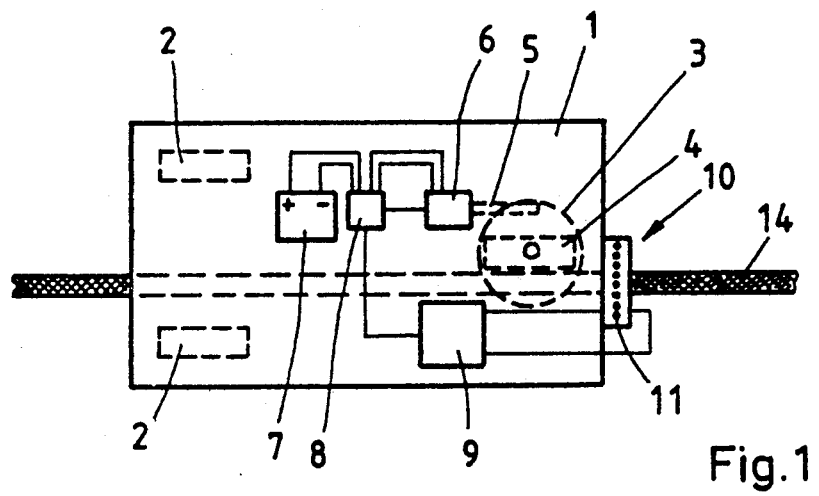
FIG. 1 schematically shows a top plan view of a driverless or self-steering vehicle comprising the apparatus for guiding such vehicle along an optical guideway or reference path and constructed according to the invention.

Turning attention now specifically to FIG. 1 of the drawings, a vehicle 1 illustrated therein by way of example and not limitation will be seen to comprise two nonsteerable wheels 2 and one steerable wheel 4 which is pivotable by means of a slewing ring or rotary rim 3. This slewing ring or rotary rim 3 is provided with a not particularly illustrated toothed ring, with which a suitable worm shaft 5 of a steering or adjustment motor 6 engages. The steering or adjustment motor 6 receives electric energy from a battery 7 and is controlled by means of a control unit or regulator 8.

This control unit or regulator 8 receives respective control pulses from a computer 9 which is connected to an optical scanning element or arrangement 10. This optical scanning element 10 comprises, as can be seen from the side view in FIG. 2, sensors 11 which are formed in each case of a transmitter S and a receiver E. The sensors 11 scan an optical guideway or reference path 14 provided on the floor. In the embodiment depicted in FIG. 1, eight sensors 11 are arranged adjacent to one another in a row which is arranged substantially transverse with respect to the optical guideway 14.

The drive of the vehicle 1 is carried out by a suitable drive motor not particularly shown in the drawings and is effected by means of the two nonsteerable wheels 2 or by means of the single steerable wheel 4.

Figure 2:
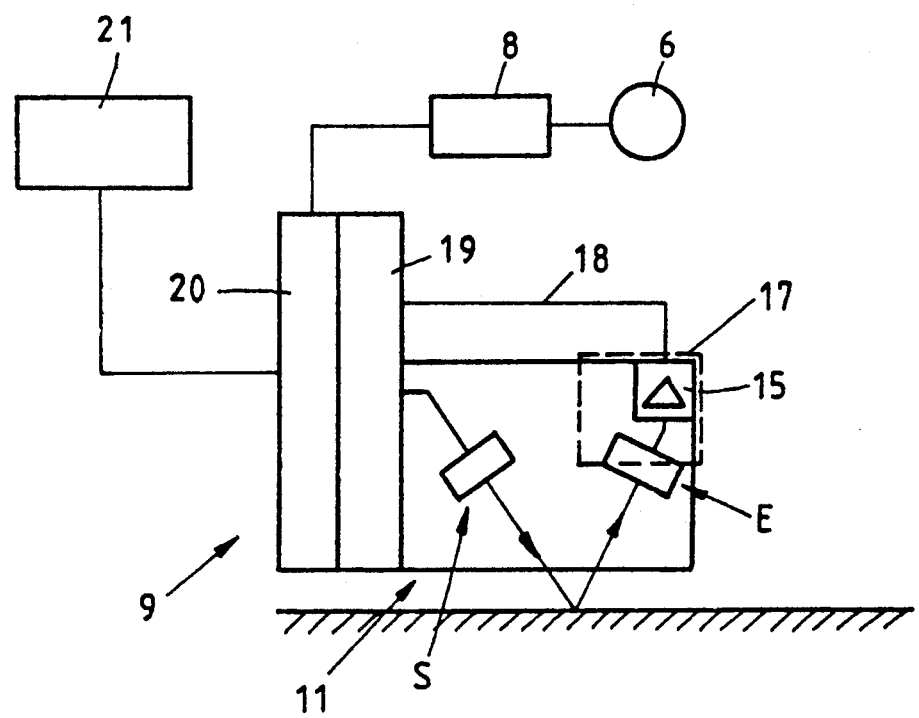
FIG. 2 schematically shows, on an enlarged scale, in side view the apparatus depicted in FIG. 1.

FIG. 2 shows a schematic arrangement of the transmitters S and the receivers E, each receiver E having connected thereafter an adjoining amplifier or amplifier stage 15 for amplifying the incoming signals. The sensors 11 are accommodated in a casing which is open towards the floor. In order to screen off interfering or spurious effects, particularly from the region of the transmitters S, the amplifiers or amplifier stages 15 are provided with an additional screen or shield 17. The amplified signals are transmitted by means of a line or circuit 18 to an evaluation stage 19 of the computer 9. The signals determined and transformed or converted in this evaluation stage 19 of the computer 9 are transmitted to a computer unit 20 which evaluates the signals and generates or produces an output signal corresponding with the evaluation for delivery to the control of the control unit or regulator 8.

A primary or controlling computer 21 comprises a host computer provided for the computer 9. The computer 9 receives instructions from this host computer 21, such instructions relating to a given driving order or drive mission. This is particularly important for the evaluation stage 19, whereby another evaluation of the determined measurement values is required in the region or area of turnouts and intersections. In other words, another calculation or computational rule is used. Likewise, certain evaluation results, particularly the status of the sensors, are transmitted to the host computer 21, whereby the host computer 21 can accordingly intervene at the vehicle drive which it controls.

The sensors 11, the evaluation stage 19 and the computer unit 20 are directly connected with each other by means of suitable plug connections not particularly shown in the drawings, thus providing a compact and simple construction.

The method of scanning the optical guideway 14 is hereinafter described in greater detail in conjunction with the schematic block circuit diagram depicted in FIG. 3.

Figure 3:
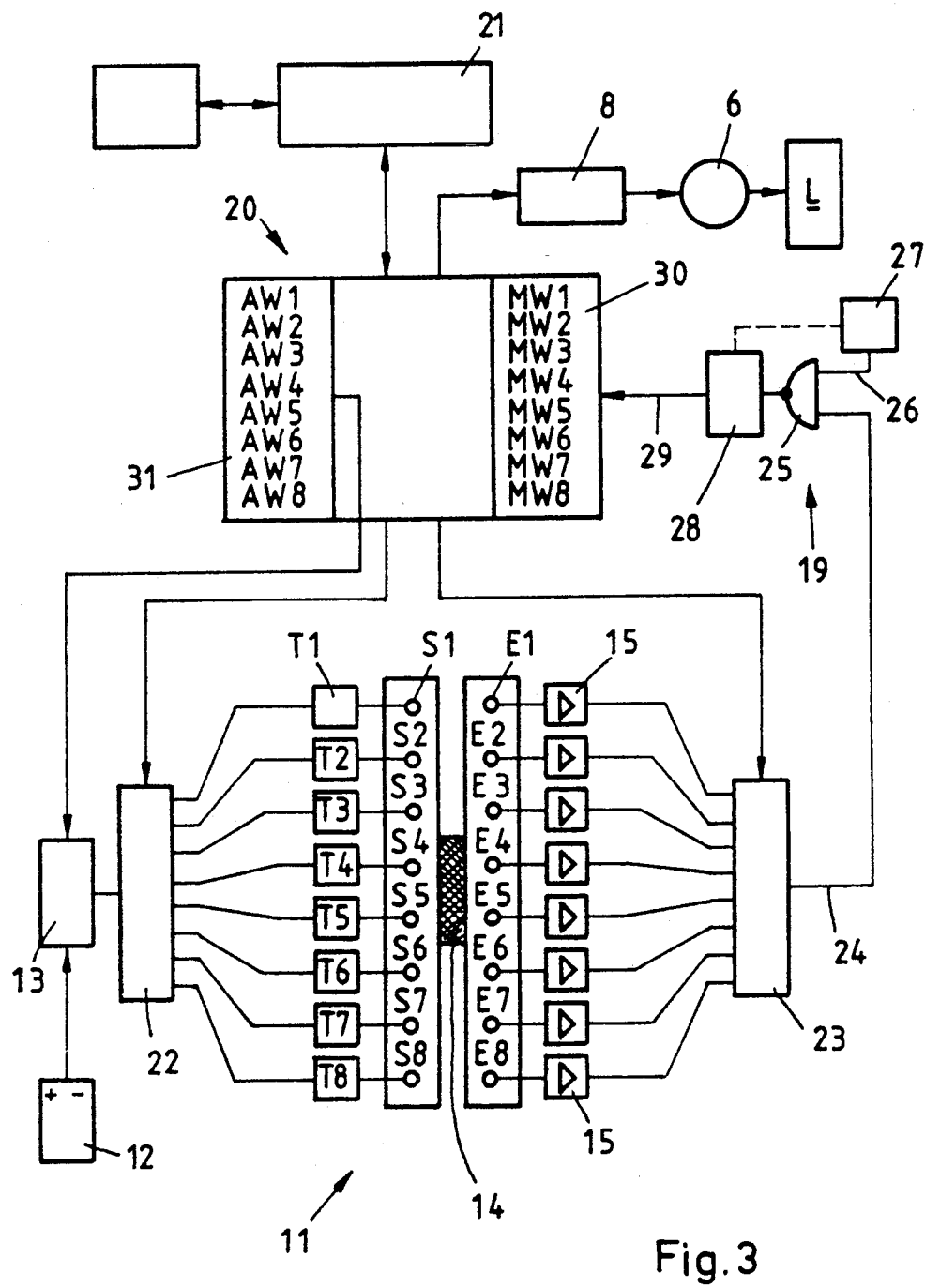
FIG. 3 schematically shows a block circuit diagram of the apparatus for guiding a self-steering vehicle along an optical guideway and constructed according to the invention.

Before the actual scanning of the optical guideway 14 can be initiated, the sensors 11 constituting transmitters S1 through S8 and receivers E1 through E8 are mutually balanced or adjusted to a specific or given value. Such adjustment or compensation is carried out in the following manner:

Constant voltage provided by an energy source 12 depicted in FIG. 3 is applied to a converter, for example, to a digital-to-analog converter 13, which can be influenced or controlled by the computer unit 20 and which supplies, in accordance with such control, an adjustment voltage to a following transmit-multiplexer 22. This transmit-multiplexer 22, which is likewise controlled by the computer unit 20, is supposed to pass on the adjustment voltage provided by the voltage converter 13 to one of eight current driver stages T1 through T8 of the sensors 11 in accordance with a predetermined switching sequence. These current driver stages T1 through T8 are successively energized by means of the transmit-multiplexer 22.

If, for example, an adjustment or compensating voltage is applied to the current drive stage T1, then the light pulse initialized by this current driver stage T1 is transmitted by means of the sensor S1 in the direction toward a reflection surface. The reflected light pulse is received by the associated receiver E1, transformed into an electric quantity or signal, and amplified by means of the associated amplifier or amplifier stage 15.

The signal or signal pulse amplified in this manner is passed on to a receive-multiplexer 23 which has the reverse function of the transmit-multiplexer 22.

The circuit through-connection controlled by means of the computer unit 20 from the connection of the receiver E1 to an output bus or line 24 renders possible the transmission of the signal in the form of signal pulses to the evaluation stage 19. This evaluation stage 19 comprises a NAND element or gate 25, at the input side of which there is connected, on the one hand, the output bus or line 24, and on the other hand, a bus or line 26 of a pulse generator 27. The pulse generator 27 transmits a continuous pulse sequence of, for example, 4 MHz. The pulses from the output bus or line 24 passing through the NAND element or gate 25 during one pulse width of a pulse delivered by the pulse generator 27 are counted by a pulse-width measuring device 28, transformed or converted and transmitted as a digital signal via a line or connection 29 to a measured-value table 30 of the computer unit 20. This process is successively carried out for each of the eight sensors S1 through S8.

The voltage converter 13 adjusts itself for each individual sensor 11, until all the measured values MW1 through MW8 of the measured-value table 30 show the same specific or predetermined value. The prerequisite for the adjustment is that the sensors 11 are aligned, during the adjustment process, to a reflection surface which is uniform over the entire width of the eight sensors 11. The adjustment values determined by means of the voltage converter 13 are stored per sensor in a so-called adjustment table 31 with the adjustment values AW1 through AW8.

The adjustment values AW1 through AW8 represent a measure for the voltage applied during the scanning process of the optical guideway 14 to the individual current driver stages T1 through T8, in order to maintain with the same reflection surface measured values MW1 through MW8 with all eight sensors 11, which measured values are of the same magnitude.

The adjustment process or operation is effected in a very short period of time, since the sensors 11 can successively transmit and receive up to 10,000 light pulses per second.

Since the determination of the adjustment values AW1 through AW8 is effected by means of the same elements, this also applying to the evaluation of the measured values during travel along the optical guideway 14, all tolerances of the components or of the entire system are thus compensated with the adjustment values.

The adjustment process or operation is carried out only once when the sensors 11 are put into service, or later only in the event of repairs or exchange of components.

By virtue of the automatic adjustment or compensation process, particularly the component tolerances of the individual reflex scanners are detected and compensated. The manufacturing tolerances with respect to different radiation intensities of the transmitters or transmitting diodes S1 through S8 and the different sensitivities of the receivers or receiving elements E1 through E8 are to some extent very large, but can be readily compensated by the automatic adjustment process.

The control of the vehicle 1 along the optical guideway 14 is carried out in the following manner:

As described hereinbefore in conjunction with the adjustment or compensation process or operation, the current driver stages T1 through T8 are successively energized by means of the transmit-multiplexer 22 with a voltage generated by the digital-to-analog converter 13 in accordance with the respective adjustment values AW1 through AW8. As in the aforesaid adjustment or compensation process, the pulses further transmitted via the receivers E1 through E8, the amplifiers or amplifier stages 15 and the receive-multiplexer 23 arrive at the evaluation stage 19 via the output bus or line 24. The pulses determined in this evaluation stage 19 are passed into the measured-value table 30. In the embodiment depicted in FIG. 3, the optical guideway or reference path 14 is located precisely in the middle of the row of receivers E1 through E8. In other words, the receivers E4 and E5 receive no light reflections or only very little light reflections from the transmitters S4 and S5. The measured-value table 30 is now evaluated in the computer unit 20 in that the measured values MW1 through MW4 and the measured values MW5 through MW8 are added and summarily compared. If the sum of the measured values MW1 through MW4 and the sum of the measured values MW5 through MW8 are substantially equal to each other, then the optical scanning element 10 and thus the vehicle 1 are in the optimum or correct position of travel. In other words, the computer unit 20 transmits no control pulse or signal to the control unit or regulator 8.

In the event of a change in the direction of vehicle travel, or if the position of the optical guideway 14 in the embodiment depicted in FIG. 3 shifts to the sensor 11 containing the transmitter S1 and the receiver E1, then the sum of the determined measured values MW1 through MW4 changes with respect to the sum of the measured values MW5 through MW8. Due to this proportional change in the sums of the measured values MW1-MW4 and MW5-MW8, the computer unit 20 transmits, in accordance with the proportional change, an analog control signal to the control unit or regulator 8 for the purpose of returning to a well balanced proportion between the sums of the measured values MW1-MW4 and MW5-MW8. This control unit or regulator 8 controls the steering or adjustment motor 6 which adjusts a steering or guiding mechanism L (FIG. 3) by means of the worm shaft 5 and the slewing ring 3 (FIG. 1). This adjustment or regulation is effected until the measured-value determination is again well balanced with respect to the sums of the two halves of the row of the eight sensors 11.

The computer unit 20 is controllable by the primary or controlling host computer 21. This is particularly necessary when the vehicle 1 approaches intersections or turnouts of the optical guideway 14. As described hereinbefore, the determined measured values MW1 through MW8 are evaluated with another evaluation basis or rule in the area of turnouts and intersections.

As depicted in FIGS. 1 and 3, the exemplary embodiment of the apparatus for guiding the vehicle 1 along the optical guideway 14 comprises only eight sensors 11 which are arranged in the transverse direction relative to the direction of vehicle travel. However, it is advantageous to use more than eight sensors 11 in order to improve scanning accuracy.

By providing analog scanning and digital evaluation for scanning the optical guideway 14, the system can render possible an accurate control, whereby a certain irregularity of the guideway 14 as well as short-term occurrence of dirt or soiling of the floor are substantially compensated. The use of so-called multiplex circuits 22 and 23 reduces the number of required components such that only one voltage converter 13 and only one evaluation stage 19 are required for all sensors 18.

While there are shown and described present preferred embodiments of the invention, it is to be distinctly understood that the invention is not limited thereto, but may be otherwise variously embodied and practiced within the scope of the following claims.

Accordingly, what we claim is:

1. A method of guiding a self-steering vehicle along an optical guideway, comprising the steps of:

scanning the optical guideway by means of light pulses emitted in a predetermined frequency by sensors comprising the step of using a row of individual sensors providing analog measurement values and the further step of digitally processing the analog measurement values;

said step of using a row of individual sensors comprising the step of using transmitters which emit light pulses and receivers which receive light pulses, said sensors being transversely arranged relative to the direction of travel of the vehicle;

said step of scanning the optical guideway comprising the step of successively effecting the scanning operation in chronological sequence relative to the number of sensors;

generating a signal from the intensity of the reflected light, received by said receivers, by means of an electronic evaluation unit comprising the step of evaluating the reflected light signals by means of a computer unit; and using the signal to control a steering mechanism.

2. The method as defined in claim 1, wherein:

said step of automatically adjusting the sensors entails the step of adjusting current driver stages of the individual sensors to a predetermined measurement value by means of an adjustment device, and the further step of including, in the adjustment process of the transmitters and receivers, the thereafter connected electronic evaluation unit and amplifier stages arranged downstream of the receivers.

3. The method as defined in claim 2, further including the step of:

using the adjustment values stored in the adjustment-value table for influencing the intensity of the emitted light pulses and for controlling components which receive the light pulses and components which transmit the light pulses.

4. The method as defined in claim 2, further including the step of:

using the adjustment values stored in the adjustment-value table as a parameter for the voltage to be applied to the current driver stages of the individual transmitters of the sensors.

5. The method as defined in claim 4, further including the steps of:

providing a constant voltage from a source of electric power; and controllably varying the voltage by means of a converter in accordance with the adjustment value called up from the adjustment-value table with respect to the sensor associated with the called up adjustment value.

6. The method as defined in claim 3, further including the step of:

using the adjustment values stored in the adjustment-value table as a parameter for determining the light intensity of the reflected light received by the individual receivers of the sensors.

7. The method as defined in claim 2, further including the step of:

using the adjustment values stored in the adjustment-value table as an arithmetical quantity in the evaluation of the determined measurement values.

8. The method as defined in claim 1, wherein:

said step of scanning the optical guideway by means of light pulses entails using infrared light pulses as a light signal.

9. The method as defined in claim 8, wherein:

said step of using infrared light pulses as the light signal entails the transmitter of each sensor emitting at least 5,000 infrared light pulses per second.

10. The method as defined in claim 8, wherein:

said step of using infrared light pulses as the light signal entails the transmitter of each sensor emitting 10,000 infrared light pulses per second.

11. The method as defined in claim 1, wherein:

said step of scanning the optical guideway by means of light pulses entails using ultraviolet light pulses as a light signal.

12. The method as defined in claim 11, further including the steps of:

emitting the ultraviolet light pulses by means of the transmitters of the sensors;

providing the optical guideway in the form of a fluorescent guide strip; and receiving by means of the receivers of the sensors the reflected ultraviolet light converted into visible light.

13. The method as defined in claim 1, further including the steps of:

providing a host computer for the computer unit; and using the electronic evaluation unit for evaluating the determined measurement values in accordance with a driving order coming from the host computer.

14. The method as defined in claim 13, further including the step of:

guiding the vehicle in the region of turnouts and deviations along an edge of the optical guideway in accordance with the driving order coming from the host computer.

15. An apparatus for guiding a self-steering vehicle along an optical guideway, the vehicle having a steering mechanism, comprising:

at least two sensors mounted at the vehicle;

said at least two sensors emitting light pulses for scanning the optical guideway;

each one of said at least two sensors comprising a transmitter and a receiver;

voltage converter means;

a source of electric power applying a substantially constant voltage to said voltage converter means;

current driver stages for respective transmitters of said at least two sensors;

each one of said at least two sensors having a predetermined adjustment value;

said current driver stages of said transmitters being energized by a voltage applied by said voltage converter means in accordance with said predetermined adjustment values;

amplifier means for each one of said receivers of said at least two sensors;

pulse-width measuring means;

computer means having an electronic evaluation stage;

said light pulses emitted by said transmitters being reflected and received by said receivers of said at least two sensors and transmitted by means of said amplifier means to said pulse-width measuring means, determined signals of which are supplied to said electronic evaluation stage of said computer means; and control means for controlling the steering mechanism of the vehicle relative to a control signal received from said electronic evaluation stage of said computer means.

16. The apparatus as defined in claim 15, wherein:
said voltage converter means constitutes a digital-to-analog converter.

17. The apparatus as defined in claim 15, wherein:
the steering mechanism includes an adjustment motor;
said adjustment motor being controlled by said control means for controlling the steering mechanism.

18. The apparatus as defined in claim 15, further including:
a transmit-multiplexer;
said current driver stages of said transmitters being successively energized by means of said transmit-multiplexer with a voltage corresponding with the respective controlled transmitter of the associated sensor;
the vehicle having a predetermined direction of vehicle travel; and
said at least two sensors being mounted at the vehicle in a direction substantially transverse to said predetermined direction of vehicle travel.

19. The apparatus as defined in claim 18, further including:
a receive-multiplexer;
an output line; and
successively delivered signals from said receivers and delivered by said individual amplifier means being successively transmitted by said receive-multiplexer to said pulse-width measuring means via said output line.

20. The apparatus as defined in claim 18, wherein:
said at least two sensors constitute at least eight sensors arranged in a row;
the optical guideway having a predetermined longitudinal direction; and
said row of at least eight sensors being substantially transversely arranged relative to said predetermined longitudinal direction of the optical guideway.

21. The apparatus as defined in claim 18, wherein:
said at least two sensors constitute sixteen sensors arranged in a row;
the optical guideway having a predetermined longitudinal direction; and
said row of sixteen sensors being substantially transversely arranged relative to said predetermined longitudinal direction of the optical guideway.

22. The apparatus as defined in claim 15, further including:
sensor plate means;
said transmitters together with said current driver stages and said receivers together with said amplifier means being mounted side by side in series at said sensor plate means; and
said amplifier means being provided with screening means with respect to said transmitters of said at least two sensors.

23. The apparatus as defined in claim 22, further including:
a printed wire board provided for said electronic evaluation stage;
a printed wire board provided for said computer means;
plug connections; and
said printed wire boards being connected to said sensor plate means by means of said plug connections.

24. The apparatus as defined in claim 15, further including:
a host computer; and
said computer means for said at least two sensors being connected to said host computer.

* * * * *